United States Patent
Bleszynski

(10) Patent No.: US 11,814,564 B2
(45) Date of Patent: Nov. 14, 2023

(54) INHIBITION OF ICE NUCLEATION WITH MODIFIED POLYVINYL ALCOHOL

(71) Applicant: University of Denver, Denver, CO (US)

(72) Inventor: Monika Bleszynski, Denver, CO (US)

(73) Assignee: University of Denver, Denver, CO (US)

( * ) Notice: Subject to any disclaimer, the term of this patent is extended or adjusted under 35 U.S.C. 154(b) by 0 days.

(21) Appl. No.: 17/314,402

(22) Filed: May 7, 2021

(65) Prior Publication Data

US 2021/0348043 A1 Nov. 11, 2021

Related U.S. Application Data

(60) Provisional application No. 63/021,421, filed on May 7, 2020.

(51) Int. Cl.
*C09K 3/18* (2006.01)
*C08L 29/04* (2006.01)
*C08F 216/06* (2006.01)

(52) U.S. Cl.
CPC .............. *C09K 3/18* (2013.01); *C08F 216/06* (2013.01); *C08L 29/04* (2013.01)

(58) Field of Classification Search
CPC ......... C09K 3/18; C08L 29/04; C08F 216/06; C08F 210/02; C08F 216/36; C09D 129/04
See application file for complete search history.

(56) References Cited

U.S. PATENT DOCUMENTS

| | | | |
|---|---|---|---|
| 2008/0036111 A1* | 2/2008 | Sun | C08J 3/247 |
| | | | 528/480 |
| 2015/0102210 A1* | 4/2015 | DeLuca | H01L 51/0097 |
| | | | 250/225 |
| 2018/0050320 A1* | 2/2018 | Verschuur | B01J 20/12 |

OTHER PUBLICATIONS

Bleszynski et al., "New Approach to Moisture Accumulation Assessment", Materials & Design, 2019, pp. 1-5, vol. 185, Publisher: Downloaded from https://www.sciencedirect.com/science/article/pii/ S0264127519306008, Published in: US.
Bleszynski et al., "Effects of Crosslinking, Embedded TIO2 Particles and Extreme Aging on PDMS Icephobic Barriers", Polymer Degradation and Stability, 2019, pp. 272-282, vol. 166, Publisher: Downloaded from https://www.sciencedirect.com/science/article/pii/ S014139101930206X.
Bouvet et al., "Antifreeze Glycoproteins", Cell Biochemistry and Biophysics, 2003, pp. 133-144, vol. 39.
Budke et al., "Ice Recrystallization Inhibition and Molecular Recognition of Ice Faces by Poly (Vinyl Alcohol)", ChemPhysChem, 2006, pp. 2601-2606, vol. 7, Publisher: Wiley-VCH.
Burkey et al., "Understanding Poly (Vinyl Alcohol)-Mediated Ice Recrystallization Inhibition Through Ice Adsorption Measurement and PH Effects", Biomacromolecules, 2017, pp. 1-39.

(Continued)

*Primary Examiner* — Joseph D Anthony
(74) *Attorney, Agent, or Firm* — Neugeboren O'Dowd PC

(57) ABSTRACT

Methods, compounds, and compositions for inhibiting ice nucleation are disclosed. A method includes selecting a modified polyvinyl alcohol molecule based on at least one altered hydroxyl distance of the modified polyvinyl alcohol molecule and applying the modified polyvinyl alcohol molecule to water molecules to inhibit ice nucleation when subjected to freezing temperatures.

3 Claims, 15 Drawing Sheets
(3 of 15 Drawing Sheet(s) Filed in Color)

(56) References Cited

OTHER PUBLICATIONS

Congdon et al., "Antifreeze (Glyco) Protein Mimetic Behavior of Poly (Vinyl Alcohol): Detailed Structure Ice Recrystallization Inhibition Activity Study", Biomacromolecules, 2013, pp. 1578-1586, vol. 14.
Deller et al., "Synthetic Polymers Enable Non-Vitreous Cellular Cryopreservation by Reducing Ice Crystal Growth During Thawing", Nature Communications, 2014, pp. 1-7, vol. 5, No. 3244.
Devries, "Glycoproteins as Biological Antifreeze Agents in Antarctic Fishes", Science, Jun. 11, 1971, pp. 1152-1155, vol. 172, No. 3988.
Gaaz et al., "Properties and Applications of Polyvinyl Alcohol, Halloysite Nanotubes and Their Nanocomposites", Molecules, 2015, pp. 2283322847, vol. 20.
Gibson, et al., "Inhibition of Ice Crystal Growth by Synthetic Glycopolymers: Implications for the Rational Design of Antifreeze Glycoprotein Mimics", Biomacromolecules, 2009, pp. 328-333, vol. 10.
Golovin et al., "Low-Interfacial Toughness Materials for Effective Large-Scale Deicing", Science, Apr. 2019, pp. 371-375, vol. 364, No. 6438, Published in: US.
Holt, "The Effect of Antifreeze Proteins and Poly(Vinyl Alcohol) on the Nucleation of Ice: A Preliminary Study", CryoLetters, 2003, pp. 323-330, vol. 24, Published in: UK.
Inada et al., "Growth Control of Ice Crystals by Poly(Vinyl Alcohol) and Antifreeze Protein in Ice Slurries", Chemical Engineering Science, 2006, pp. 3149-3158, vol. 61.
Knight et al., "Adsorption of Alpha-Helical Antifreeze Peptides on Specific Ice Crystal Surface Planes", Biophys J., Feb. 1991, pp. 409-418, vol. 59, No. 2.
Matsumoto et al., "Molecular Dynamics Simulation of the Ice Nucleation and Growth Process Leading to Water Freezing.", Nature, Mar. 28, 2002, pp. 409-413, vol. 416.
Menini et al., "Advanced Icephobic Coatings", Journal of Adhesion Science and Technology, 2011, pp. 971-992, vol. 25.
Mochizuki et al., "Promotion of Homogeneous Ice Nucleation by Soluble Molecules", Journal of the American Chemical Society, 2017, pp. 17003-17006, vol. 139.
Nandi et al., "Electro-Nucleation of Water Nano-Droplets in No Mans Land to Fault-Free Ice IC", Phys. Chem. Chem. Phys., 2018, pp. 8042-8053, vol. 20.
Ogawa et al., "Anomalous Ice Nucleation Behavior in Aqueous Polyvinyl Alcohol Solutions", Chemical Physics Letters, 2009, pp. 86-89, vol. 480.
Pummer et al., "Ice Nucleation By Water-Soluble Macromolecules", Atmospheric Chemistry and Physics, 2015, pp. 4077-4091, vol. 15.
Qui et al., "Ice Nucleation Efficiency of Hydroxylated Organic Surfaces is Controlled by Their Structural Fluctuations and Mismatch to Ice", J. Am. Chem. Soc., 2017, pp. 3052-3064, vol. 139.
Ramlov, "Aspects of Natural Cold Tolerance in Ectothermic Animals", Human Reproduction, 2000, pp. 26-46, vol. 15, No. 5.
Reinhardt et al., "Free Energy Landscapes for Homogeneous Nucleation of Ice for a Monatomic Water Model", The Journal of Chemical Physics, 2011, pp. 11, vol. 136.
Rottger et al., "Lattice Constants and Thermal Expansion of H2O and D2O Ice IH Between 10 and 265 K", Acta Crystallogrphica Section B, 1994, pp. 644-648, vol. B50, Publisher: International Union of Crystallography, Published in: GB.
Weng et al., "Molecular Dynamics at the Interface Between Ice and Poly(Vinyl Alcohol) and Ice Recrystallization Inhibition", Langmuir, 2017, vol. 34, No. 17.
Wowk et al., "Inhibition of Bacterial Ice Nucleation by Polyglycerol Polymers", Cryobiology, 2002, pp. 14-23, vol. 44.
Zhuang, "Reconstruction of the Repetitive Antifreeze Glycoprotein Genomic Loci in the Cold-Water Gadids Boreogadus Saida and Microgadus Tomcod", Marine Genomics, Jun. 2018, pp. 73-84, vol. 39, Publisher: Downloaded from https://www.sciencedirect.com/science/article/pii/S1874778718300345?via%3Dihub.

\* cited by examiner

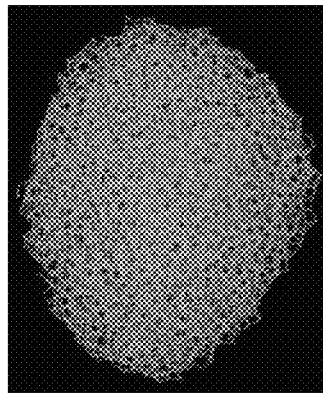
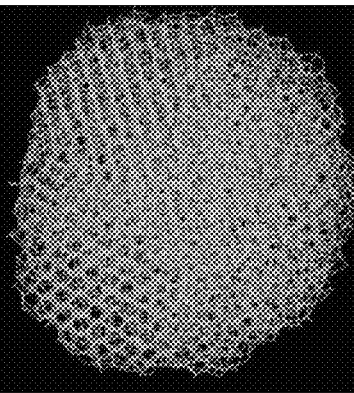
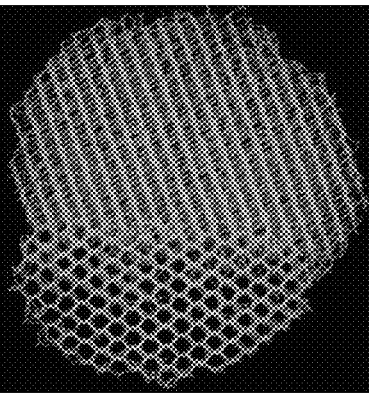
FIG. 6A     FIG. 6B     FIG. 6C
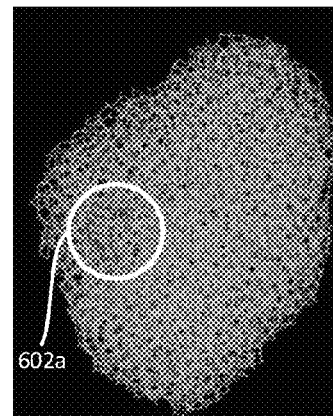
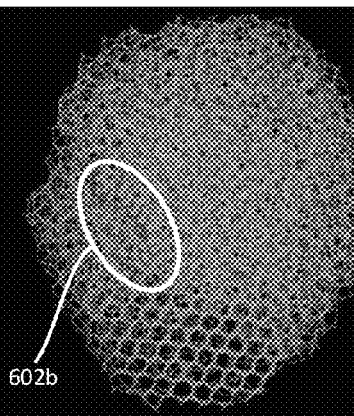
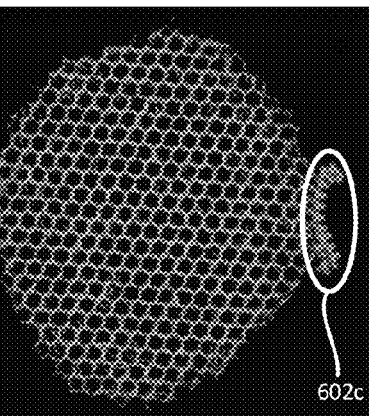
FIG. 6D     FIG. 6E     FIG. 6F
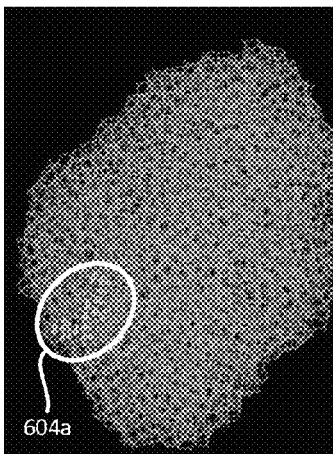
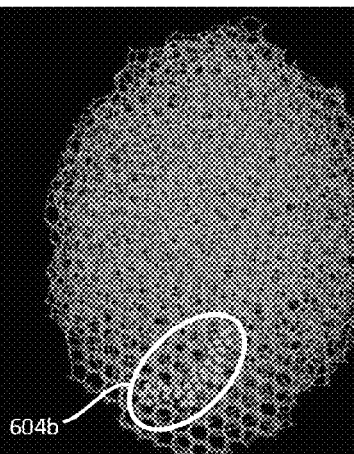
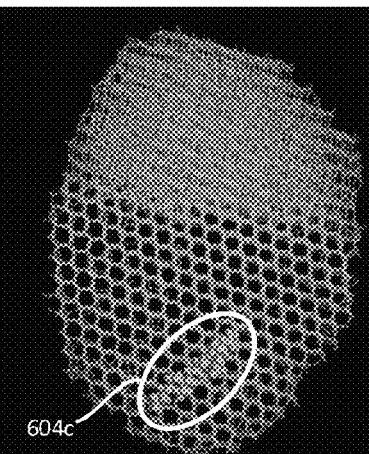
FIG. 6G     FIG. 6H     FIG. 6I

INHIBITION OF ICE NUCLEATION WITH MODIFIED POLYVINYL ALCOHOL

SPONSORED RESEARCH AND DEVELOPMENT

This invention was made with government support under 1362135 awarded by the National Science Foundation. The government has certain rights in the invention.

CLAIM OF PRIORITY UNDER 35 U.S.C. § 119

The present Application for Patent claims priority to Provisional Application No. 63/021,421 entitled "METHODS AND COMPOUNDS FOR AFFECTING ICE NUCLEATION WITH POLYVINYL ALCOHOL" filed May 7, 2020 and assigned to the assignee hereof and hereby expressly incorporated by reference herein.

FIELD OF THE DISCLOSURE

The present disclosure relates generally to effects of polyvinyl alcohol on ice nucleation. In particular, but not by way of limitation, the present disclosure relates to methods, compounds, and compositions for inhibiting ice nucleation using modified polyvinyl alcohol.

BACKGROUND

Various means have been presented for preventing ice formation, including low ice adhesion surfaces and antifreeze agents. In order to develop new antifreeze agents many have sought to mimic biological antifreeze compounds. These compounds play critical roles in preventing ice formation in plants, fish, and insects indigenous to cold climates. In order to survive in sub-freezing waters, animals such as Antarctic Notothenioids (*Boreogadus saida*) produce antifreeze glycoproteins (AFGPs), which limit the formation of ice in their veins, allowing them to inhabit waters ranging from 0° C. to −4° C. For example, AFGPs can bind to different ice faces depending on the glycoprotein type, thereby inhibiting the growth of the ice crystal.

Unfortunately, the instability and high cost of AFGPs make them impractical for large-scale commercial applications. Understanding and recreating the non-colligative freezing point depression and ice recrystallization inhibition (IRI) properties of AFGPs has therefore been of particular interest for areas of science, consumer products, and medicine. In particular, since AFGPs have been shown to inhibit ice nucleation, there has been considerable interest in creating similar synthetic polymers. Specifically, polyvinyl alcohol (PVA) is a polymer which has drawn considerable interest as an antifreeze agent since it has been identified as a compound which can inhibit ice nucleation in solution.

Therefore, a need exists for demonstrating whether and how particular formulations of polyvinyl alcohols can inhibit ice formation, and how such inhibition may be usefully applied to the prevention of ice formation in various applications in stable and low-cost compounds.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

Some aspects of the present disclosure may be characterized as a method for inhibiting ice nucleation. The method may include selecting a modified polyvinyl alcohol molecule, modified to alter at least one hydroxyl distance between at least one pair of adjacent hydroxyl groups, based on at least one altered hydroxyl distance of the modified polyvinyl alcohol molecule. The method may also include applying the modified polyvinyl alcohol molecule to water molecules to inhibit ice nucleation when subjected to freezing temperatures.

Other aspects of the present disclosure may be characterized as a compound for inhibiting ice nucleation. The compound may include a modified polyvinyl alcohol molecule, modified to alter at least one hydroxyl distance between at least one pair of adjacent hydroxyl groups on a polymer backbone of a polyvinyl alcohol molecule. The at least one altered hydroxyl distance may be greater than ~2.8 Å and less than ~7.1 Å.

Other aspects of the present disclosure may be characterized as a composition including as an active ingredient an effective amount of modified polyvinyl alcohol molecules, each modified to alter at least one hydroxyl distance between at least one pair of adjacent hydroxyl groups on a polymer backbone of each polyvinyl alcohol molecule, to inhibit ice nucleation. An average hydroxyl distance between each pair of adjacent hydroxyl groups on the polymer backbone of each of the modified polyvinyl alcohol molecules may be greater than ~2.8 Å and less than ~7.1 Å.

BRIEF DESCRIPTION OF THE DRAWINGS

The application file contains at least one drawing executed in color.

Copies of this patent application publication or patent with color drawings will be provided by the Office upon request and payment of the necessary fee.

FIGS. 6A-I illustrate exemplary experimental nucleation simulation results showing a progression of ice nucleation over time within simulated water droplets without a constrained ice embryo, wherein the simulated water droplets are shown before, during, and after ice nucleation for pure water (FIGS. 6A-C respectively), water in the presence of PVA (2) (FIGS. 6D-F respectively), and water in the presence of PVA (4) (FIGS. 6G-I respectively);

FIGS. 9A-B illustrate exemplary modified PVA molecules that may be used to inhibit ice nucleation in accordance with one or more embodiments, wherein FIG. 9A illustrates a modified polyvinyl alcohol subunit consisting of one polyvinyl alcohol monomer with the hydroxyl groups removed from the carbon backbone, and FIG. 9B illustrates a modified polyvinyl alcohol molecule comprising of three modified polyvinyl alcohol subunits.

DETAILED DESCRIPTION

Figure 1A:
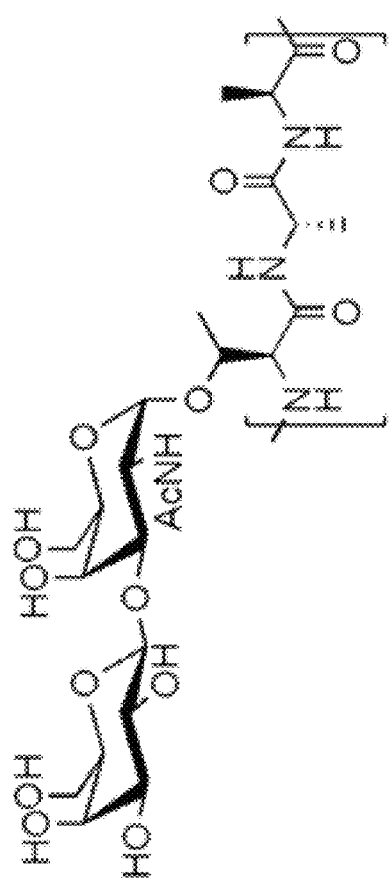
FIG. 1A illustrates a structure of native AFGP-8 [3]

The word "exemplary" is used herein to mean "serving as an example, instance, or illustration." Any embodiment described herein as "exemplary" is not necessarily to be construed as preferred or advantageous over other embodiments.

The present disclosure provides methods, compounds, and compositions that may inhibit ice nucleation, reducing ice formation, using particular formulations of modified polyvinyl alcohols (PVAs) that are stable and may be produced at low cost. In some embodiments, PVA molecules may be modified to alter hydroxyl distances between adjacent hydroxyl groups along polymer backbones of the PVA molecules. For example, the hydroxyl distances may be altered to be at least one of greater than ~2.8 Å and less than ~7.1 Å, greater than ~2.8 Å and less than ~6.7 Å, greater than ~2.8 Å and less than ~6.5 Å, and greater than 3.1 Å and less than ~6.5 Å. Hydroxyl distances may be altered uniformly across a whole PVA molecule, or nonuniformly with hydroxyl distances varying across a PVA molecule.

Adjacent hydroxyl groups may be two hydroxyl groups, separated by the requisite distance, which are attached to a polymer backbone with no other hydroxyl groups attached to the polymer backbone in between the two hydroxyl groups. The two hydroxyl groups may be considered adjacent hydroxyl groups even if other functional groups are attached to the polymer backbone in between the two hydroxyl groups, so long as the water molecule separation effect (described further herein) is achieved and no other hydroxyl groups are attached to the polymer backbone between the two hydroxyl groups.

PVA, notably, has a simple, linear carbon-based backbone, making it a generally stable molecule. Furthermore, it can be easily derived from polyvinyl acetate at a low cost, unlike AFGPs which have complex organic ring and peptide structures, making them difficult to synthesize.

The modified PVA molecules disclosed herein having altered hydroxyl distances, such as greater than ~2.8 Å and less than ~7.1 Å, may be used to form compounds and compositions for application in any setting wherein a delay or inhibition of ice nucleation (i.e., ice formation) is desired. Such compounds and compositions may include antifreeze, de-icing products, and solid surface coatings for icing prevention and may be used in any such application for which antifreeze and de-icing products are currently used. For example, products comprising the modified PVA molecules of the present disclosure may be used in automotive or other combustion engines as antifreeze, in windshield de-icing fluid, in airplane de-icing fluid, in compounds and compositions for de-icing roads and sidewalks, in compounds and compositions for de-icing infrastructure, such as buildings, rooftops, homes, etc., and in compounds and compositions for de-icing aircraft and spacecraft. The compounds and compositions may also be used in other applications in which existing antifreeze or de-icing compounds and compositions cannot be used because of, e.g., their toxicity. For example, modified PVA compounds and compositions of the present disclosure may be used in agricultural, horticultural, farming, food product, cosmetic, surgical, or other medical applications where low temperatures may be present, such as during manufacturing, distribution, or storage. The potential applications of the compounds and compositions described herein is not an exhaustive list, and others may be used in relation to the methods, compounds, and compositions of the present disclosure.

Some embodiments of the present disclosure may comprise a compound for inhibiting ice nucleation comprising a modified polyvinyl alcohol molecule. Specifically, the modified polyvinyl alcohol molecule may be modified to alter at least one hydroxyl distance between at least one pair of adjacent hydroxyl groups on a polymer backbone of a polyvinyl alcohol molecule. Such modification may include the relocation, removal, or addition of hydroxyl groups and other functional groups along the polymer backbone of the modified polyvinyl alcohol molecule. For example, a functional group may be added to each end of the modified polyvinyl alcohol molecule as a cap compound. The at least one altered hydroxyl distance may be at least one of greater than ~2.8 Å and less than ~7.1 Å, greater than ~2.8 Å and less than ~6.7 Å, greater than ~2.8 Å and less than ~6.5 Å, and greater than ~3.1 Å and less than ~6.5 Å. Such hydroxyl distances may enable the compound to effectively inhibit ice nucleation.

In some embodiments, an average hydroxyl distance between each pair of adjacent hydroxyl groups on the polymer backbone of the modified polyvinyl alcohol molecule may be at least one of greater than ~2.8 Å and less than ~7.1 Å, greater than ~2.8 Å and less than ~6.7 Å, greater than ~2.8 Å and less than ~6.5 Å, and greater than ~3.1 Å and less than ~6.5 Å.

In some embodiments, each hydroxyl distance between each pair of adjacent hydroxyl groups on the polymer backbone of the modified polyvinyl alcohol molecule may be at least one of greater than ~2.8 Å and less than ~7.1 Å, greater than ~2.8 Å and less than ~6.7 Å, greater than ~2.8 Å and less than ~6.5 Å, and greater than ~3.1 Å and less than ~6.5 Å.

In some embodiments, the modified polyvinyl alcohol molecule may comprise 200 or fewer mers. Each mer may, for example, comprise three carbons of the polymer backbone along with any attached functional groups. The mers may differ, such as with different functional groups. For example, some mers may have no functional group, while others may have a hydroxyl group attached. Shorter modified polyvinyl alcohol molecules, such as 200 or fewer mers, may enable the compound to more easily interact with water molecules and more effectively inhibit ice nucleation.

Some embodiments of the present disclosure may comprise a composition that comprises as an active ingredient an effective amount of modified polyvinyl alcohol molecules to inhibit ice nucleation. Specifically, each modified polyvinyl alcohol molecule may be modified to alter at least one hydroxyl distance between at least one pair of adjacent hydroxyl groups on a polymer backbone of each polyvinyl alcohol molecule. Such modification may include the relocation, removal, or addition of hydroxyl groups and other functional groups along the polymer backbones of the modified polyvinyl alcohol molecules. For example, a functional group may be added to each end of each of the modified polyvinyl alcohol molecules as a cap compound. The at least one altered hydroxyl distance may be at least one of greater than ~2.8 Å and less than ~7.1 Å, greater than ~2.8 Å and less than ~6.7 Å, greater than ~2.8 Å and less than ~6.5 Å, and greater than ~3.1 Å and less than ~6.5 Å. Such hydroxyl distances may enable the composition to effectively inhibit ice nucleation.

In some embodiments, an average hydroxyl distance between each pair of adjacent hydroxyl groups on the polymer backbone of each of the modified polyvinyl alcohol molecules may be at least one of greater than ~2.8 Å and less than ~7.1 Å, greater than ~2.8 Å and less than ~6.7 Å, greater than ~2.8 Å and less than ~6.5 Å, and greater than ~3.1 Å and less than ~6.5 Å.

In some embodiments, each hydroxyl distance between each pair of adjacent hydroxyl groups on the polymer backbone of each of the modified polyvinyl alcohol molecules may be at least one of greater than ~2.8 Å and less than ~7.1 Å, greater than ~2.8 Å and less than ~6.7 Å, greater than ~2.8 Å and less than ~6.5 Å, and greater than ~3.1 Å and less than ~6.5 Å.

In some embodiments, the modified polyvinyl alcohol molecules of the composition may each comprise 200 or fewer mers. Each mer may, for example, comprise three carbons of the polymer backbone along with any attached functional groups. The mers may differ, such as with different functional groups. For example, some mers may have no functional group, while others may have a hydroxyl group attached. Shorter modified polyvinyl alcohol molecules, such as 200 or fewer mers, may enable the composition to more easily interact with water molecules and more effectively inhibit ice nucleation.

In some embodiments, the composition may be a liquid, such as an antifreeze solution. For example, the composition may be a liquid, and the modified polyvinyl alcohol molecules of the composition may each comprise 100 to 150 mers. The liquid form of the composition may enable more efficient storage, distribution, and application of the composition, such as through washing, spraying, mixing, etc. onto or into a medium to inhibit ice nucleation. Additionally, the liquid composition may enable the incorporation of supplemental compounds that may enhance the functionality of the modified polyvinyl alcohol molecules. For example, enzymes may be incorporated into the liquid composition and be configured to reduce the length of the modified polyvinyl alcohol molecules, such as to improve inhibition of ice nucleation, and break down the modified polyvinyl alcohol molecules over time, such as to improve biodegradability and reduce potential environmental concerns.

In some embodiments, the composition may comprise a solid medium configured to receive and slowly release the modified polyvinyl alcohol molecules. For example, the modified polyvinyl alcohol molecules may be incorporated into a solid three-dimensional polymer mesh, a porous silicone or rubber material, or other porous media configured to receive and slowly release the modified polyvinyl alcohol molecules over time. Such incorporation of the modified polyvinyl alcohol molecules into a solid medium for slow release may enable more effective inhibition of ice nucleation than, for example, a solid mass of longer, non-crosslinked modified polyvinyl alcohol molecules. Additionally, the incorporation of the modified polyvinyl alcohol molecules into the solid medium may enable for more versatile and longer lasting application of the composition to inhibit ice nucleation. For example, the solid medium may be applied to a surface to form a surface coating that may slowly release modified polyvinyl alcohol molecules to inhibit ice nucleation. Such a surface coating may easily be applied to automobiles, aircraft, spacecraft, infrastructure, sidewalks, homes, and a wide variety of surfaces that may potentially be exposed to freezing temperatures.

Overall, the compounds and compositions of the present disclosure enable highly versatile inhibition of ice nucleation in both liquid and solid form. The disclosed modified polyvinyl alcohols may enable the production and application of non-toxic, non-corrosive, biodegradable compounds and compositions configured to prevent icing in a wide variety of applications previously unable to utilize ice-prevention agents due to safety concerns. Additionally, the disclosed modified polyvinyl alcohols are stable and may be produced with high cost-efficiency, especially in comparison to alternatives such as AFGPs.

The present disclosure also provides methods for modeling the effect of various modified PVA molecules having different hydroxyl group distances using molecular dynamics simulations. The disclosure describes particular experiments for modeling these effects and how they may be used to demonstrate the efficacy of particular modified PVA molecules, such as those having hydroxyl distances greater than ~2.8 Å and less than ~7.1 Å, on delaying and/or inhibiting ice nucleation and ice formation.

Using molecular dynamics simulations of nucleating water in the presence of various modified PVA molecules, the exemplary experimental methods of the present disclosure demonstrate that the hydroxyl (OH) functional group distance may be a key factor in either promoting or inhibiting ice nucleation. For example, a hydroxyl distance smaller than ~2.8 Å and greater than ~7.1 Å in modified PVA compounds may be associated with the promotion of ice nucleation. By contrast, a modified PVA molecule with a hydroxyl group distance of approximately ~5.0 Å may be correlated with a delay and/or inhibition of ice nucleation.

Figure 1B:
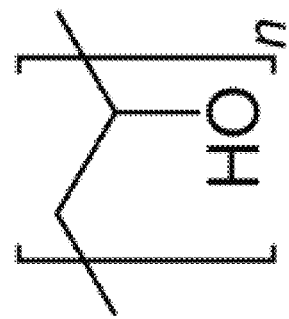
FIG. 1B illustrates a polyvinyl alcohol monomer, in accordance with one or more embodiments.

Referring now to the drawings, FIGS. 1A and 1B illustrate a structure of native AFGP-8 [3] and a polyvinyl alcohol monomer, respectively, for comparison. Although it lacks the complex polypeptide backbone of most AFGPs, PVA is similar to AFGPs in that it contains primarily hydroxyl (OH) groups, which have been found to be a key element in PVA's enabling IRI.

PVA may be formed through hydrolysis of polyvinyl acetate and may be fully or partially hydrolyzed. When fully hydrolyzed, PVA may exhibit strong inter-molecular hydrogen bond interactions due to the close proximity of the hydroxyl groups, but while partially hydrolyzed PVA may not exhibit such inter-molecular hydrogen bond interactions due to the intermediate placement of $COCH_3$ groups. While the molecular-level specifics of ice crystallization may remain unclear, recent research suggests a correlation between IRI of antifreeze proteins and lattice matching with an ice structure. Although the effects of PVA on ice nucleation have been investigated, there is an inconsistency with regard to ice nucleation activity of PVA: it has been shown that PVA can either promote or inhibit ice nucleation. For example, PVA can promote homogeneous ice crystallization by destabilizing a liquid phase of the ice, while partially hydrolyzed PVA may exhibit IRI activity that may be attributed to the Gibbs-Thomson effect. This difference is especially noteworthy, considering that the differences in partially and fully hydrolyzed PVA lie in substitutions of hydroxyl (OH) functional groups along a PVA backbone.

Evidence of a geometrical match between PVA and ice has recently been found, where oxygen atoms from PVA hydroxyl groups may form hydrogen bonds with the ice structure, assuming that a O . . . O distance is not greater than 3.5 Å and a O—H . . . O bond angle is greater than 145°. The hydroxyl oxygen atoms may geometrically match a lattice of the ice structure by taking the place of oxygen ice atoms, where the radial distribution function between the $O_{ice}$-$O_{ice}$ has a first primary peak at 2.75 Å and a secondary peak at 4.5 Å. Given this evidence, it can be presumed that the effects of PVA on ice nucleation may depend on PVA's hydroxyl distance between adjacent hydroxyl groups and hydroxyl group quantity in order for a geometrical match to occur with an ice lattice. Therefore, the exemplary experiments of the present disclosure are directed toward determining the effects of PVA hydroxyl distance on ice nucleation. The exemplary experiments also may be used to determine how the substitution and modification of hydroxyl groups may cause modified PVA molecules to swing between promoting or inhibiting ice nucleation.

Figure 2:
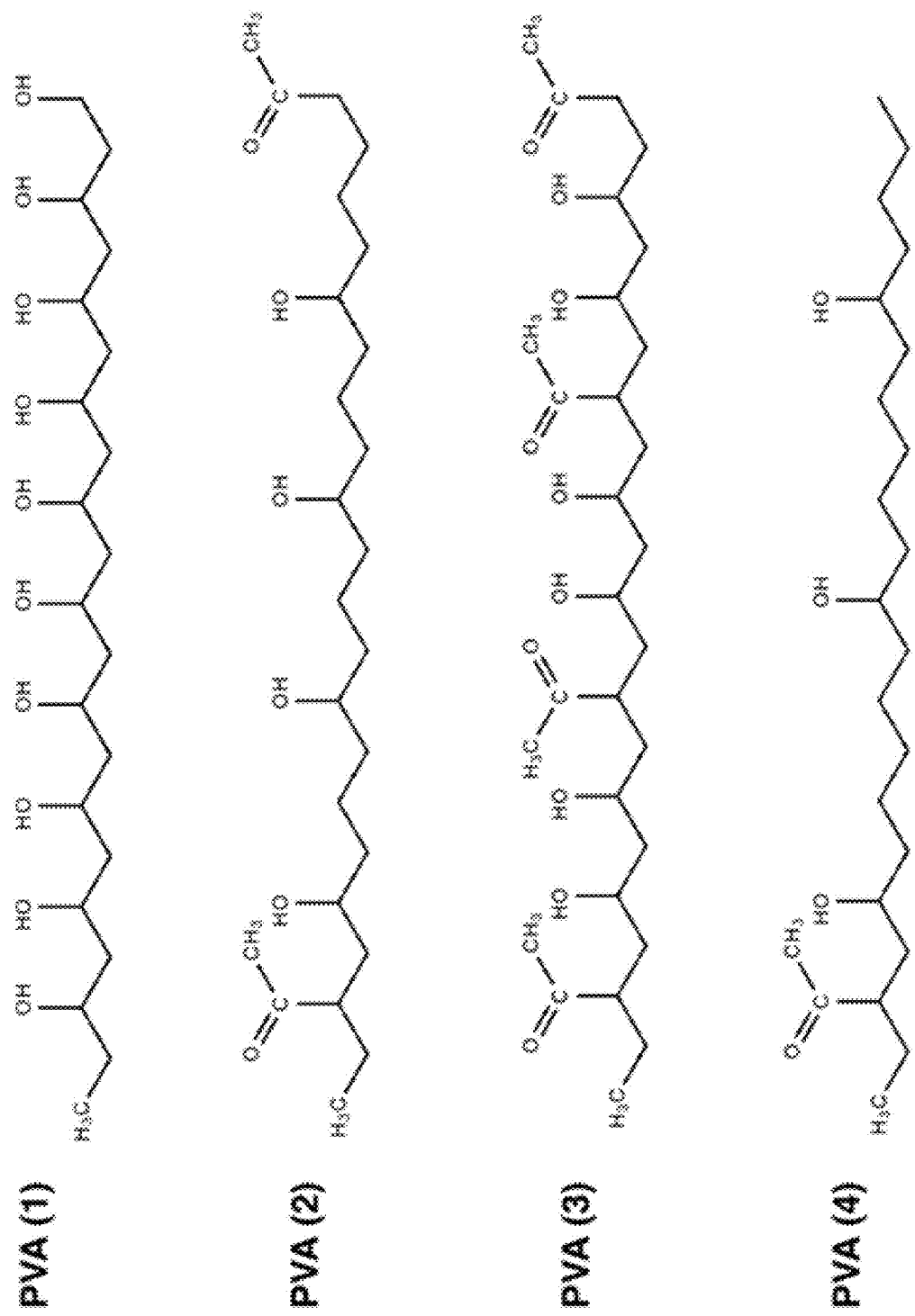
FIG. 2 illustrates molecular structures of four different exemplary modified polyvinyl alcohol molecules (PVA (1), (2), (3), and (4)) that may be used in ice nucleation simulations in the exemplary experiments of the present disclosure.

FIG. 2 illustrates the molecular structure of four different modified polyvinyl alcohol molecules (PVA (1), (2), (3), and (4)) that may be used in ice nucleation simulations in the exemplary experiments of the present disclosure. To observe the effects of modified PVA molecules on ice nucleation, a series of numerical ice nucleation simulations, with and without modified PVA molecules, may be conducted using molecular dynamics simulation software, such as Materials Studio molecular dynamics (MD) software. The four different modified PVA (10 mer) molecules shown in FIG. 2 may be constructed from a base PVA structure that is modified, such as to vary the distance between the hydroxyl (OH) groups and add additional functional groups. Hydroxyl distances may be calculated in the simulation software by measuring the shortest distance between oxygen atoms from each hydroxyl group. PVA (2), (3), and (4) have added acetyl groups, which may be introduced to determine the effects of additional functional groups and to subdivide the hydroxyl groups.

Two sets of simulations may be performed for each modified PVA type: with and without a constrained ice embryo present. Molecular dynamics simulations may, for example, be constructed by manually placing each modified PVA molecule on a pre-constructed 84.183 Å diameter water droplet, which may consist of 1705 water molecules. The water droplet may be constructed by adding water molecules to a pre-built ice embryo approximately 16×5×20 Å in size, such as shown in FIG. 3.

Figure 3:
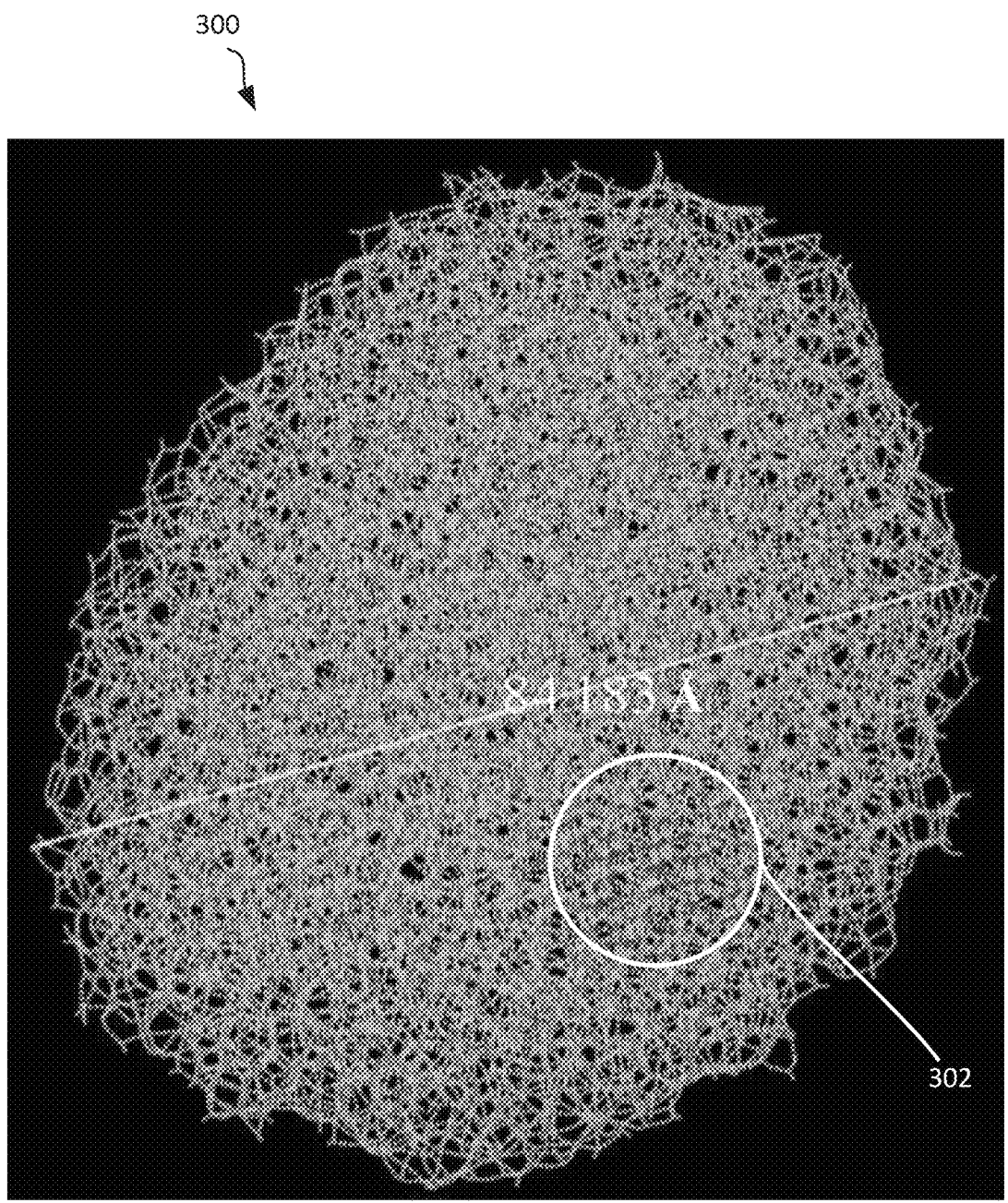
FIG. 3 illustrates an exemplary simulated ~84 Å diameter water droplet with a constrained ice embryo (in red), before initiation of molecular dynamics nucleation simulations.

FIG. 3 illustrates a simulated ~84 Å diameter water droplet 300 with a constrained ice embryo 302, or ice nuclei, (in red), before initiation of molecular dynamics nucleation simulations. The ice embryo 302 may be initially unconstrained and allowed to melt in the first set of simulations. The ice embryo 302 may then be constrained for the second set of simulations in order to facilitate nucleation. Parameters for the molecular dynamics simulations may be kept constant among all nucleation simulations, for consistency. After initial construction, but before nucleation simulations, all simulations may be optimized for geometry using, for example, the Newton-Raphson method. Nucleation simulations may be run first at NVE (constant number of particles N, volume V, and energy E), and then at NVT (constant number of particles N, volume V, and temperature T) for a total of 15,000 picoseconds (ps). Temperature may be held constant at 250 K, with an undercooling of 23 K, and quasi Newton-Raphson may be utilized for all nucleation simulations. Final simulation results for both initiation and completion of nucleation, may be plotted as a function of time (picoseconds).

A free energy profile may be evaluated in order to determine the crystallization of a nucleus in such nucleation simulations. Classical nucleation theory (CNT) states that the equation for the Gibbs energy barrier G of a spherical cluster consisting of N particles can be expressed by the following formula:

$$\Delta G(N) = -N\Delta_{fus}\mu + \gamma[36\pi(N/\rho)^2]^{1/3} \quad \text{(Formula 1)}$$

where ρ is a number density of the crystalline phase, $\Delta_{fus}\mu$ is a change in chemical potential on fusion and γ is an interfacial free energy between two phases. Thus, an estimation of the applicability of CNT can be obtained for numerical ice nucleation systems using Formula 1. Because changes in potential energy of a system can be used as an indicator of nucleation, total potential energy of each system in the nucleation simulations may be monitored before, during, and after nucleation.

Figure 7:
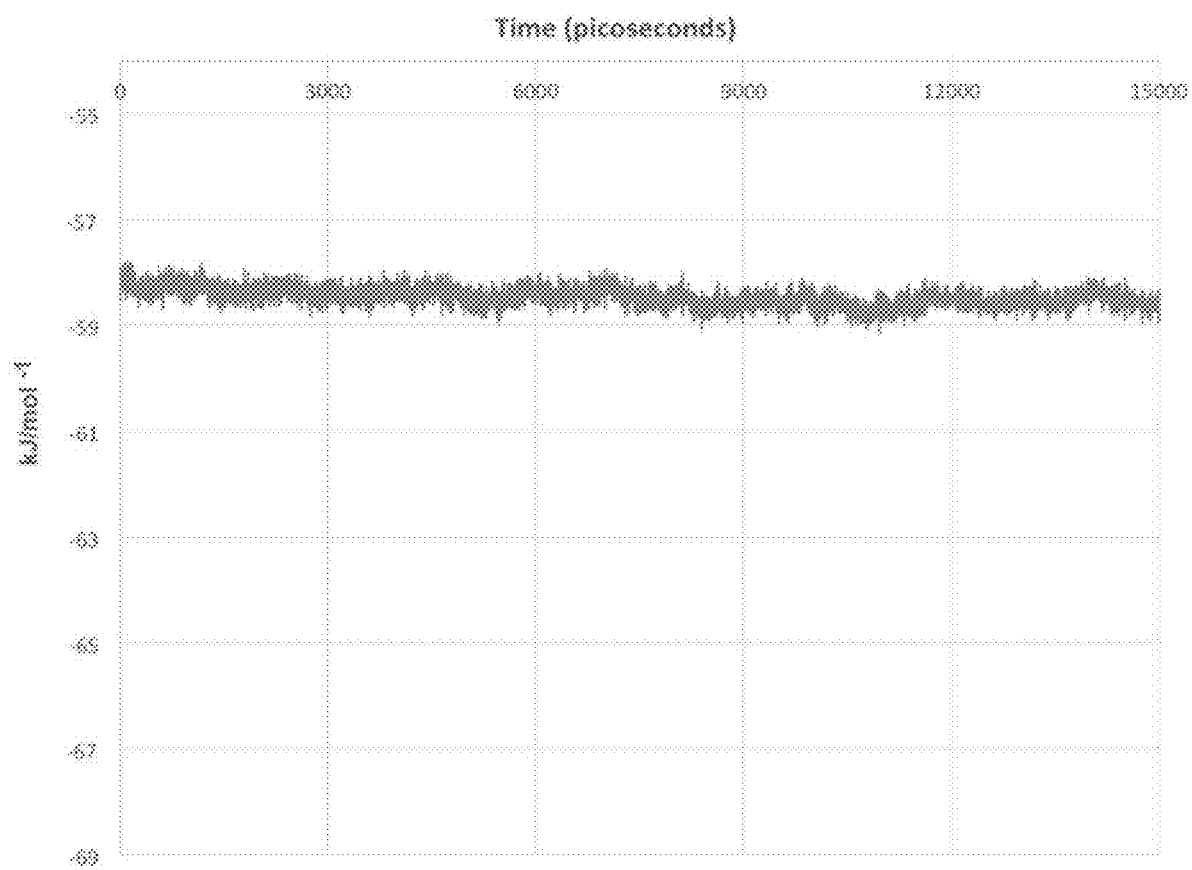
FIG. 7 illustrates exemplary computational nucleation simulation results showing a graph of total potential energy of a simulated water droplet with an unconstrained ice embryo in the presence of four PVA (2) molecules over 15,000 ps.

While many of the exemplary nucleation simulations only include one modified PVA molecule, some nucleation simulations may include multiple modified PVA molecules of a particular type, such as four molecules of PVA (2) that may yield the data shown in FIG. 7, or multiple modified PVA molecules of varying types. Given that ice nucleation inhibition may be directly affected by the concentration of IRI compounds, a multiple modified PVA molecule simulation may be conducted to determine the effect of modified PVA molecule concentration on ice nucleation inhibition.

Figures 4A, 4B:
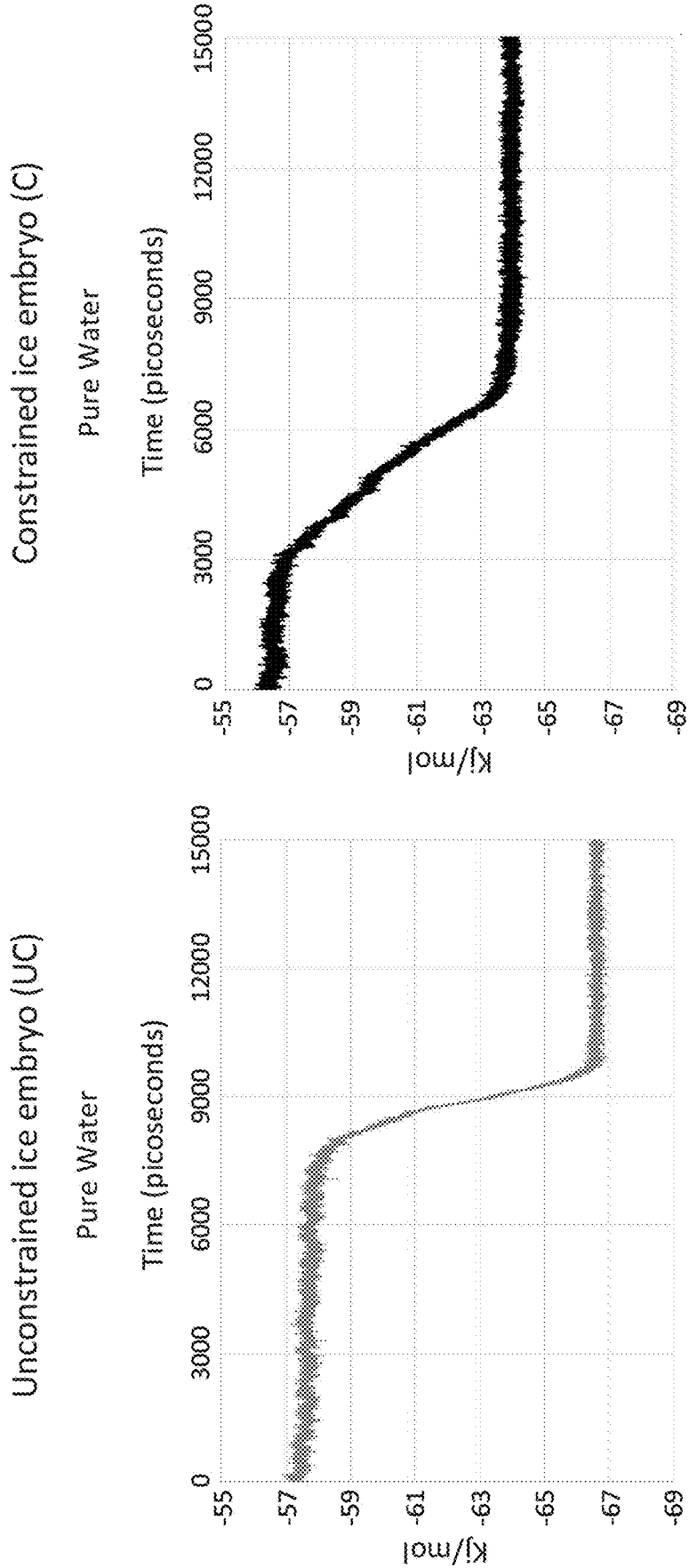
FIGS. 4A-J illustrate exemplary experimental nucleation simulation results showing graphs of total potential energy (Kj/mol) as a function of time (ps) in simulated water droplets without a constrained ice embryo (UC) and with a constrained ice embryo (C) for pure water (FIG. 4A and FIG. 4B respectively), water with PVA (1) (FIG. 4C and FIG. 4D respectively), water with PVA (2) (FIG. 4E and FIG. 4F respectively), water with PVA (3) (FIG. 4G and FIG. 4H respectively), and water with PVA (4) (FIG. 4I and FIG. 4J respectively)
Figure 4D:
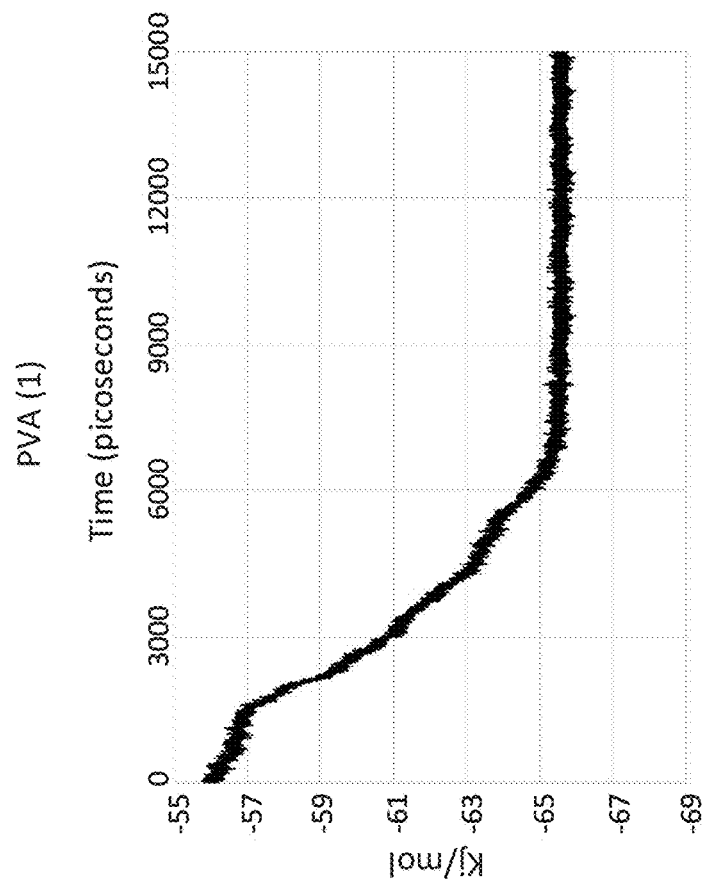
Figure 4C:
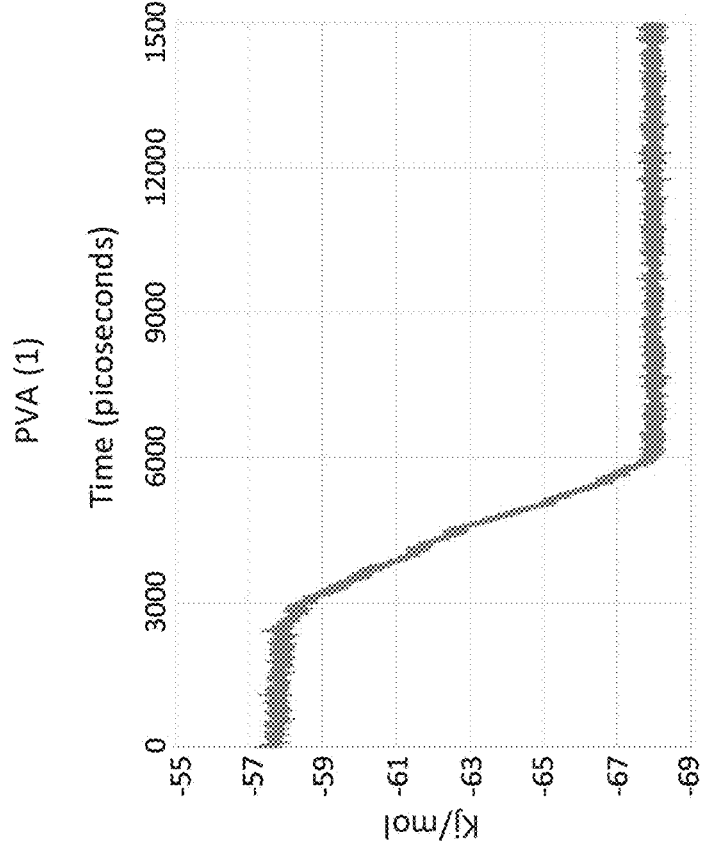
Figure 4F:
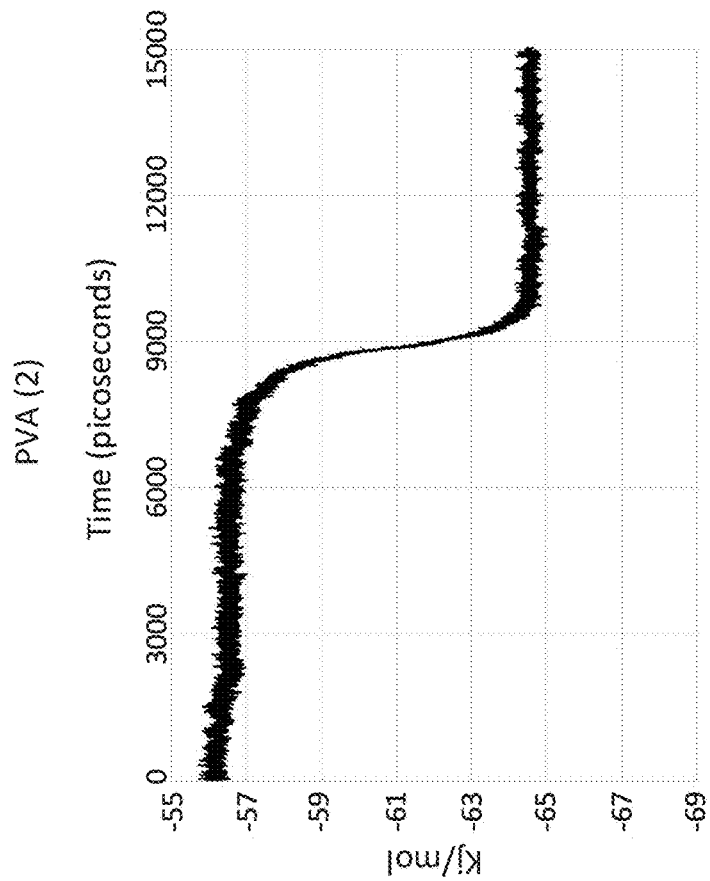
Figure 4E:
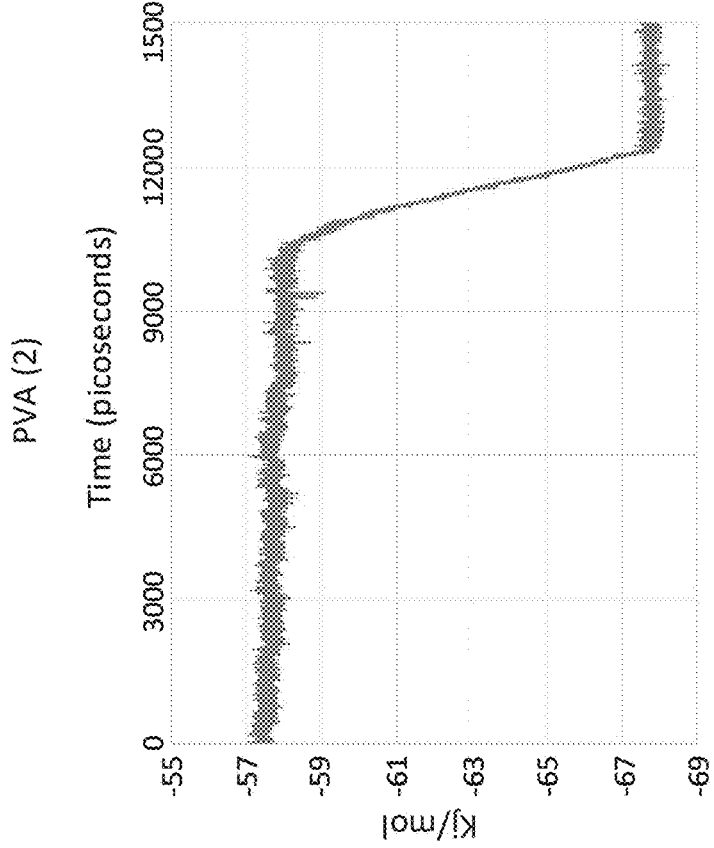
Figure 4H:
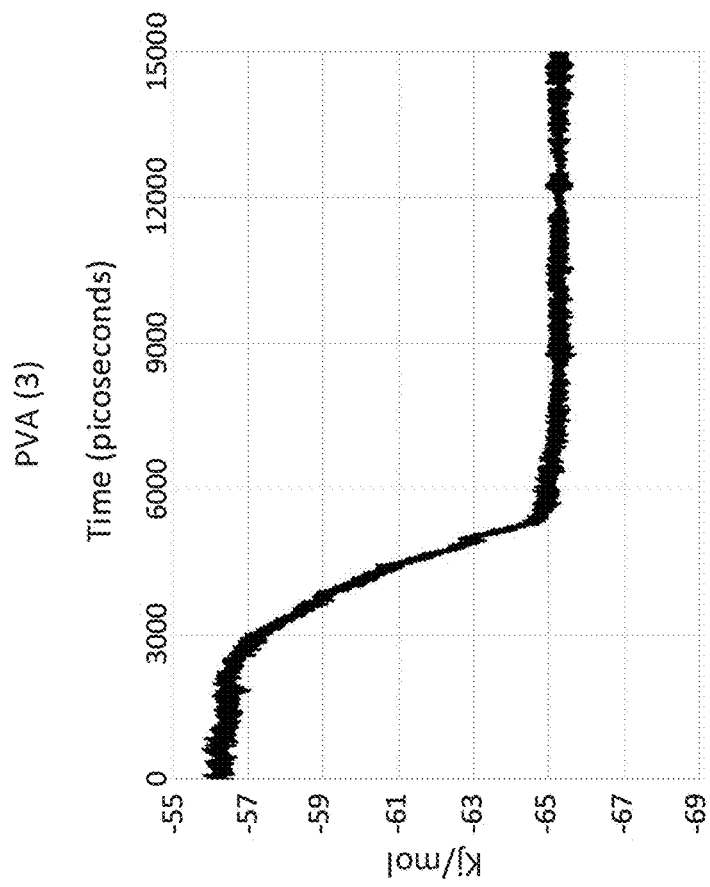
Figure 4G:
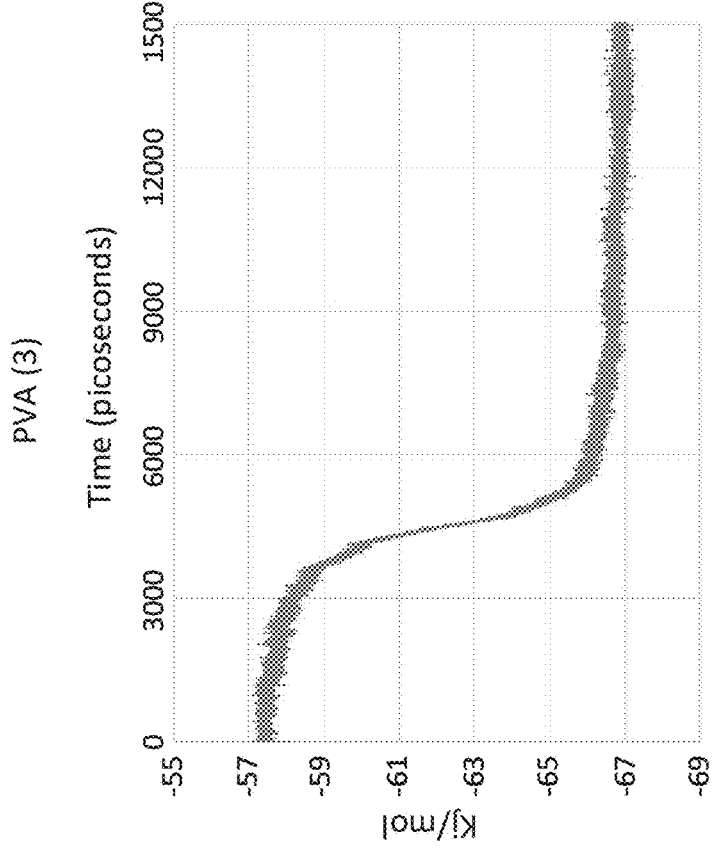
Figures 4I, 4J:
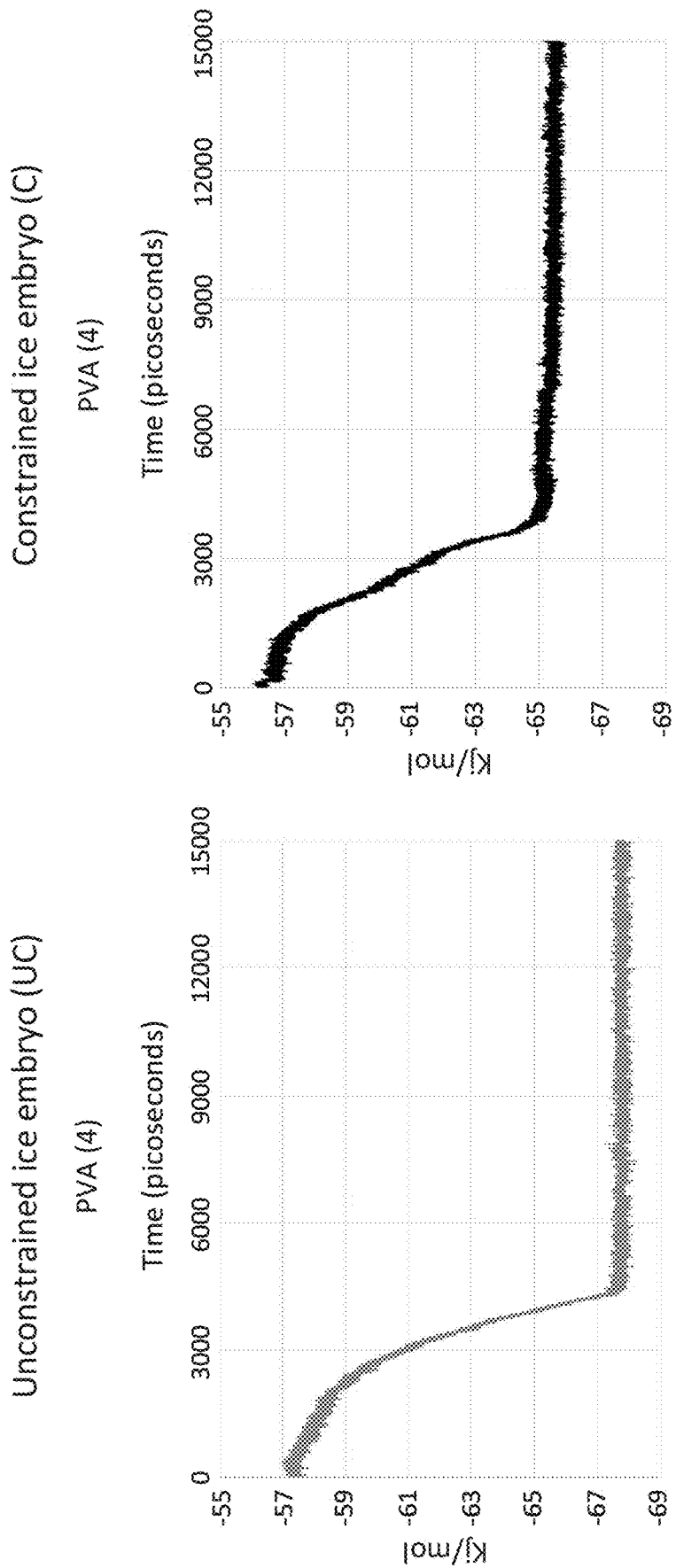
Figure 5A:
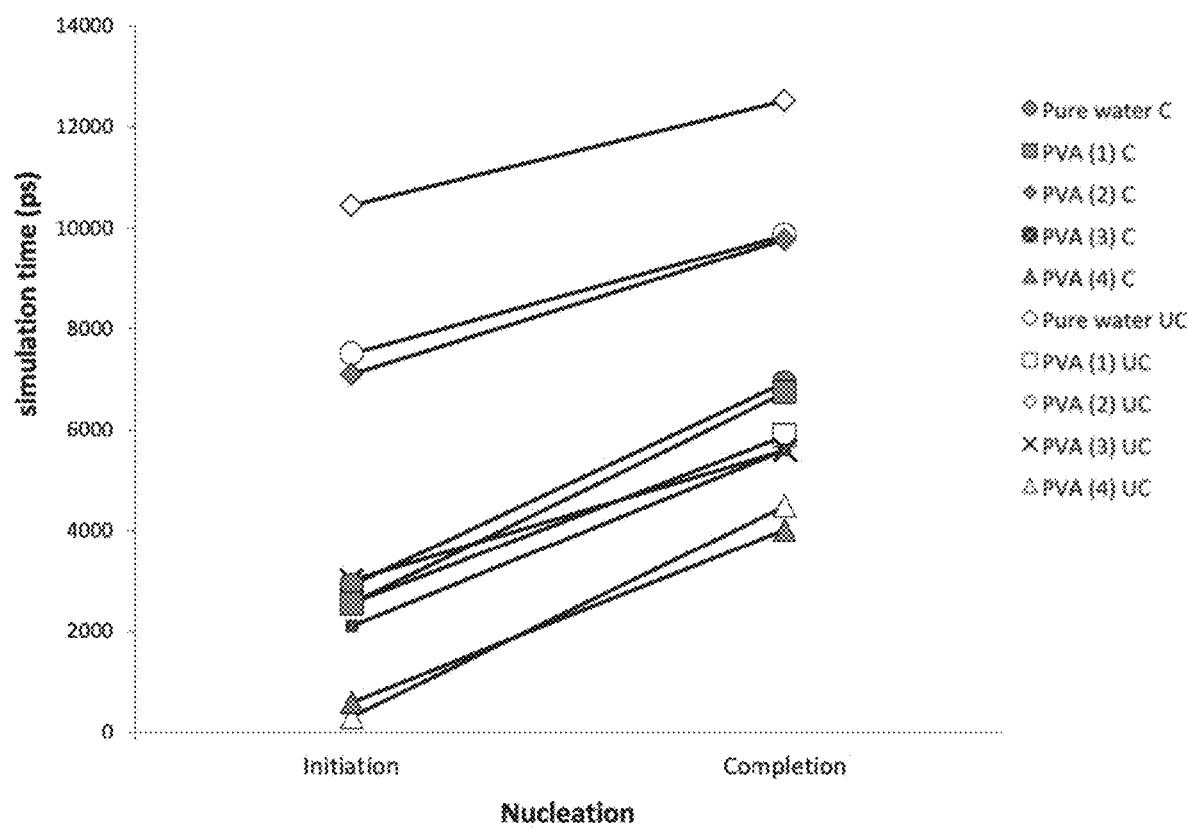
FIG. 5A illustrates exemplary experimental nucleation simulation results showing ice nucleation initiation and completion times of the simulated water droplets with constrained (C) and unconstrained (UC) ice embryos.
Figure 5B:
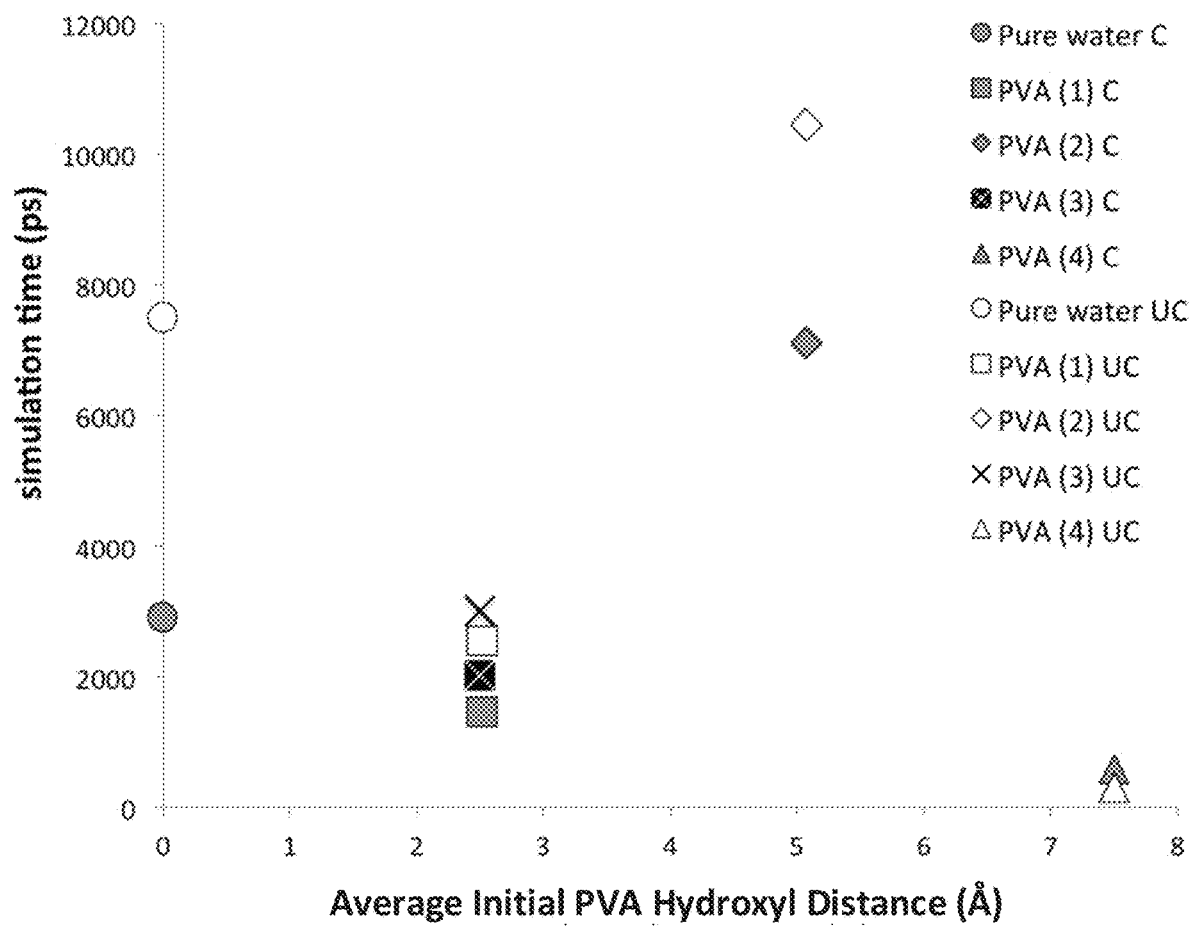
FIG. 5B illustrates exemplary experimental nucleation simulation results showing ice nucleation initiation times of simulated water droplets with constrained (C) and unconstrained (UC) ice embryos as function of average initial PVA hydroxyl distance.

FIGS. 4A-J will now be referred to simultaneously along with FIGS. 5A-B in a discussion of the exemplary experimental nucleation simulation results.

FIGS. 4A-J illustrate exemplary experimental nucleation simulation results showing graphs of total potential energy (Kj/mol) as a function of time (ps), which may be used to determine the progression of ice nucleation in simulated water droplets without a constrained ice embryo (UC) and with a constrained ice embryo (C) for pure water (FIG. 4A and FIG. 4B respectively), water with PVA (1) (FIG. 4C and FIG. 4D respectively), water with PVA (2) (FIG. 4E and FIG. 4F respectively), water with PVA (3) (FIG. 4G and FIG. 4H respectively), and water with PVA (4) (FIG. 4I and FIG. 4J respectively). Nucleation may be assumed to occur when the total potential energy of each system abruptly decreases.

FIG. 5A illustrates exemplary computational nucleation simulation results showing the ice nucleation initiation and completion times of the simulated water droplets with constrained (C) and unconstrained (UC) ice embryos for pure water, water with PVA (1), water with PVA (2), water with PVA (3), and water with PVA (4); FIG. 5B illustrates exemplary computational nucleation simulation results showing the ice nucleation initiation times of the simulated water droplets with constrained (C) and unconstrained (UC) ice embryos as function of average initial PVA hydroxyl distance for pure water, water with PVA (1), water with PVA (2), water with PVA (3), and water with PVA (4).

Average initial hydroxyl distances for the modified PVA molecules of the nucleation simulation may be measured and monitored to gauge the effect hydroxyl distance has on ice nucleation. In the exemplary nucleation simulations, the average initial hydroxyl distances of the four modified PVA molecules were: 2.547 Å for PVA (1), 5.045 Å for PVA (2), 2.667 Å for PVA (3), and 7.747 Å for PVA (4).

The exemplary nucleation simulations whose data is depicted in the graphs of FIGS. 4A-J and FIGS. 5A-B each utilized one molecule of a specific modified PVA type and resulted in the nucleation of hexagonal ice, with notable differences. For example, the nucleation simulations show a clear promotion of ice nucleation in the presence of PVA (1), (3), and (4) compared to the nucleation of pure water, regardless of ice embryo constraint (see FIG. 5B). Ice nucleation was initiated the fastest in the presence of PVA (4), with nucleation beginning almost immediately at 300 ps (see FIGS. 4I-J). This was followed closely by PVA (1) and PVA (3), which both initiated nucleation sooner than pure water (see FIGS. 4C-D and FIGS. 4G-H). Nucleation of pure water initiated at 7,510 ps and 2,970 ps for unconstrained and constrained simulations, respectively (see FIGS. 4A-B).

By contrast, PVA (2), with an average initial hydroxyl distance of ~5 Å, extended the initiation of nucleation compared to pure water by a significant margin with nucleation being initiated at approximately 10,450 ps and 7,100 ps, for unconstrained and constrained ice embryos, respectively (see FIGS. 4E-F and FIGS. 5A-B). Nucleation was therefore delayed by approximately 40% and 144%, for unconstrained and constrained ice embryo simulations by the presence of PVA (2).

The average hydroxyl distances in all four modified PVA molecules changed after nucleation was complete, with the average hydroxyl distance of the modified PVA molecules being: 2.828 Å for PVA (1), 5.725 Å for PVA (2), 2.855 Å for PVA (3), and 7.117 Å for PVA (4) after nucleation. The largest changes in average hydroxyl distance were in PVA (2), which exhibited an increase of 0.68 Å, and PVA (4), which decreased by 0.63 Å.

In the exemplary nucleation simulations, only PVA (2) with an average initial hydroxyl distance of 5.045 Å was correlated with a delay in ice nucleation. The other modified PVA molecules with either smaller or larger initial hydroxyl distances promoted ice nucleation by shortening the time to nucleation compared to pure water, regardless of the presence of a constrained embryo (see FIGS. 5A-B).

FIGS. 6A-I illustrate exemplary experimental nucleation simulation results showing a progression of ice nucleation over time within simulated water droplets without a constrained ice embryo. Specifically, simulated water droplets are shown before, during, and after ice nucleation for pure water (FIGS. 6A-C respectively), water in the presence of PVA (2) (FIGS. 6D-F respectively), and water in the presence of PVA (4) (FIGS. 6G-I respectively). The geometries of the final crystalline ice structures were notably different for pure water (FIG. 6C) and water in the presence of modified PVA molecules (FIG. 6F and FIG. 6I). In pure water simulations with (not shown) and without constrained ice embryos (FIGS. 6A-C), ice initiated at three separate locations and continued until the crystalline faces joined, and the final nucleated ice structure consisted of two separate crystalline assemblies (see FIG. 6C). Crystallization of the pure water droplet did not extend from the ice embryo, but instead nucleated preferentially from the edge of the water droplet and continued through the water droplet in the x-axis, in both the constrained and unconstrained simulations. In simulations with modified PVA molecules, PVA (1), (3) and (4) molecules adsorbed on the 001 basal plane of the ice crystal after ice crystallization, while PVA (2) adsorbed on the 100 plane. Additionally, PVA (2) moved significantly around the simulated water droplet before and during crystallization from its initial position 602a to its position during crystallization 602b to its final position after crystallization 602c (see FIGS. 6D-F). PVAs (1), (3), and (4), on the other hand, did not considerably migrate across the simulated water droplet surface before or during nucleation. For example, PVA (4) moved very little before and during crystallization of the simulated water droplet from its initial position 604a to its position during crystallization 604b to its final position after crystallization 604c (see FIGS. 6G-I).

FIG. 7 illustrates exemplary experimental nucleation simulation results showing a graph of total potential energy (Kj/mol) of a simulated water droplet with an unconstrained ice embryo in the presence of four PVA (2) molecules over 15,000 ps. As demonstrated by the lack of a significant change in total potential energy, the water droplet was not nucleated in the allotted time frame of 15,000 ps when in the presence of four PVA (2) molecules. This is in contrast to the exemplary experimental results depicted in FIGS. 4A-J where single modified PVA molecules were used, all of which resulted in nucleation of the water droplet in less than 15,000 ps. The potential energy of the water droplet system with four PVA (2) molecules did fluctuate and remained slightly lower than that of the system with a single PVA (2) molecule.

Figure 8B:
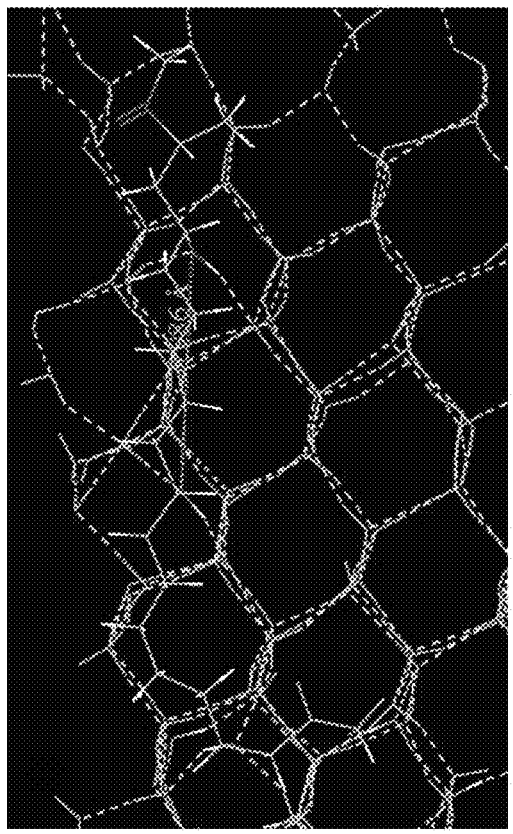
FIGS. 8A-8D illustrate exemplary computational nucleation simulation results showing hexagonal ice structures with modified PVA molecules after nucleation of a simulated water droplet without a constrained ice embryo in the presence of PVA (1) (FIG. 8A), PVA (3) (FIG. 8B), PVA (4) (FIG. 8C), and PVA (2) (FIG. 8D)
Figure 8D:
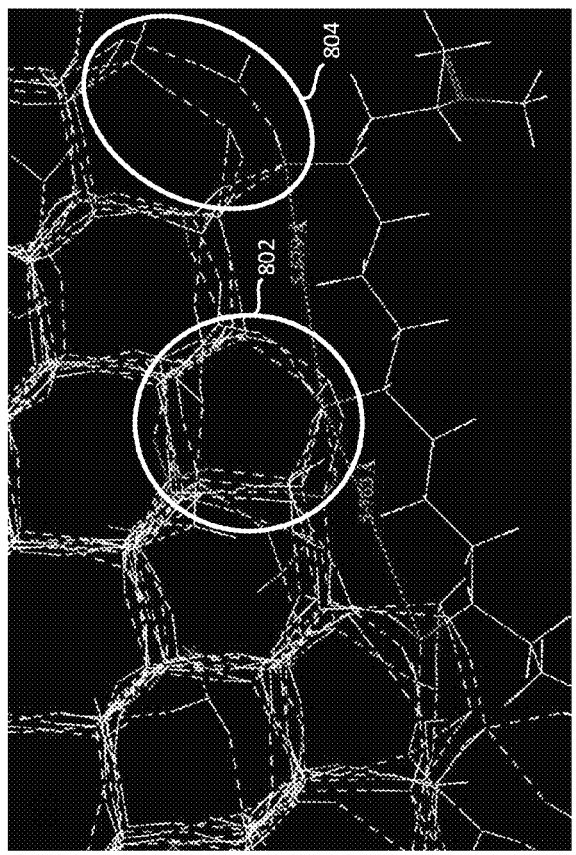
Figure 8A:
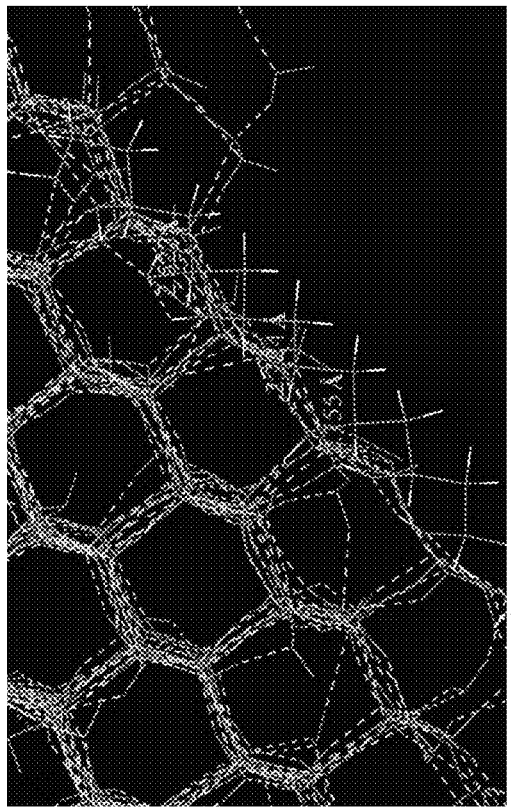
Figure 8C:
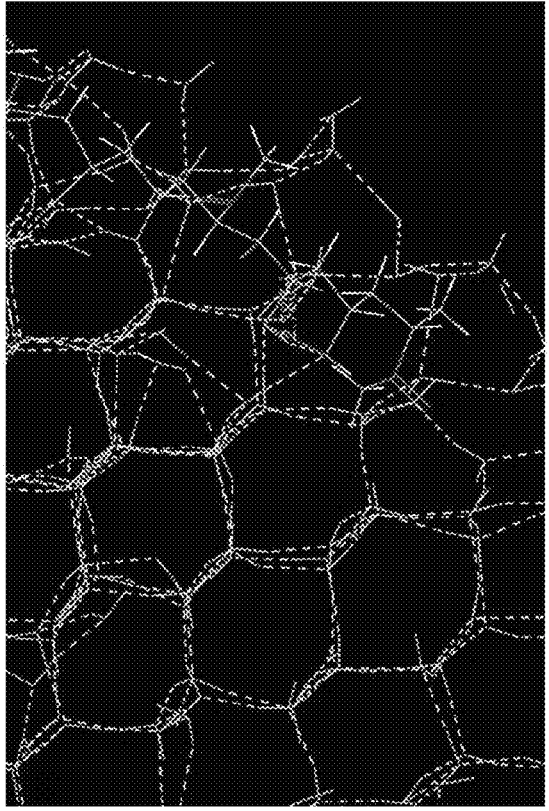

FIGS. 8A-8D illustrate exemplary experimental nucleation simulation results showing hexagonal ice structures with modified PVA molecules after nucleation of a simulated water droplet without a constrained ice embryo in the presence of PVA (1) (FIG. 8A), PVA (3) (FIG. 8B), PVA (4) (FIG. 8C), and PVA (2) (FIG. 8D). Calculating $O_{ice}$-$O_{ice}$ distances between water molecules in nucleated pure ice with no modified PVA yielded an average of 2.689 Å, which is very close to initial/final hydroxyl distances of PVA (1) and PVA (3): (2.547/2.828 Å and 2.667/2.855 Å respectively). The presence of carbonyl groups in PVA (3) appeared to only minimally affect the initiation of nucleation. Additionally, upon nucleation, PVA (1), (3), and (4) did not significantly disturb the hexagonal crystalline structure of the ice (see FIGS. 8A-8C).

By contrast, PVA (2) distorted the hexagonal ice structure where the hydroxyl groups were in contact with the water molecules, forming pentagonal instead of hexagonal rings near a first hydroxyl group 802 and stretching the hexagonal ice structure near a second hydroxyl group 804. This suggests that the distortion and stretching of the crystalline structure when in contact with PVA (2) may be linked to the longer nucleation time of water when in the presence of PVA (2), as the modified PVA molecule impedes normal hexagonal crystal formation. Therefore, it appears PVA (1), (3), and (4) may promote ice nucleation by either of two mechanisms: by reducing the total potential energy of the system or by acting as a scaffold for ice nucleation and growth.

In the exemplary experimental nucleation simulations, the promotion, delay, or even inhibition of ice nucleation was shown to be greatly affected by the presence of ice embryos, as well as modified PVA structure and concentration. Ice nucleation was initiated sooner when a constrained ice embryo was present in all cases. However, PVA (2) delayed ice nucleation by a much greater margin, compared to other modified PVA molecules. When a greater concentration of PVA (2) molecules was added, ice nucleation did not occur in the simulation timeframe of 15,000 ps, indicating possible nucleation inhibition activity of PVA (2).

The exemplary computational nucleation simulations showed drastic differences in nucleation activity depending on the hydroxyl distance along the polymer backbone among the various types of modified PVAs. An increase or decrease in hydroxyl distance beyond a critical value was shown to either promote or inhibit ice nucleation. It can therefore be inferred that a hydroxyl distance may be adjusted to delay or inhibit ice nucleation. For example, for ice nucleation inhibition to occur, the hydroxyl distance for molecules such as modified PVA may be greater than 2.855 Å but less than 7.117 Å.

Small differences in hydroxyl distances and their effects on ice nucleation could help to explain the IRI activity of other well-known anti-freeze compounds, such as ethylene glycol and propylene glycol, which have hydroxyl distances of approximately 3.832 Å and 2.911 Å, respectively when measured from O . . . O. Such hydroxyl distances can be compared to the dimensions of hexagonal crystal ice. In the exemplary experimental nucleation simulations average $O_{ice}$-$O_{ice}$ measured distances of ice were 2.76 Å, which is very close to the hydroxyl distance of PVA (1) and (3). The similarity of such hydroxyl distances to $O_{ice}$-$O_{ice}$ distances supports the notion that additives such as PVA can promote homogeneous crystallization by destabilizing the liquid phase when a particular set of structures is present.

Alternatively, the hydroxyl distance of PVA (2) mimics that of liquid water, and the bending and twisting motion of the PVA (2) polymer backbone may provide a small increase in local kinetic energy, which could act to stabilize the liquid phase. As temperature is decreased, intramolecular motion is decreased, until longer-lasting hydrogen bonds start to form between water and hydroxyl groups on the modified PVA backbone. In the case of PVA (2), these hydrogen bonds may "lock" the hydroxyl groups in place at 0.63 Å farther apart than on the native backbone, which induces a net strain on the PVA (2) molecule. The combination of supplemental kinetic energy due to polymeric intramolecular motion and the additional energy required to strain the PVA (2) molecule may create an energy barrier to crystallization that inhibits ice nucleation. This inhibition is especially noticeable when more molecules of PVA (2) are present, such as shown in FIG. 7 where four PVA (2) molecules prevented ice nucleation altogether during the 15,000 ps simulation.

In contrast, when the hydroxyl distance on the modified PVA backbone is either smaller or larger than that of liquid water, as in PVA (4), the intramolecular motion of the modified PVA chain may create a local hydrogen repulsion zone (as hydrogen moves around its oxygen host), which may increase the local potential energy and promote the formation of a lower energy crystalline phase away from the modified PVA molecule. Once a crystal network has enveloped a PVA (4) molecule, the hydroxyl groups may be forced to move 0.68 Å closer and are "locked" into position on the backbone; however, the strain induced in the molecule in this case is negligible.

Since IRI activity was found in the exemplary experimental nucleation simulations to occur when a hydroxyl group distance of a modified PVA molecule falls in a specific range, such as between 2.858 Å and 7.5117 Å, new compounds and compositions may be constructed and/or selected for ice nucleation inhibition based upon such a specific range determined through experimental nucleation simulations. However, such compounds may be constructed and/or selected while maintaining the flexibility of the underlying backbone composition and overall compound structure in order to maintain ice nucleation inhibition functionality.

As shown in the preceding exemplary experimental nucleation simulations, the hydroxyl group distance of the modified PVA molecules affected the time and ability of ice to nucleate. It is contemplated that hydroxyl distances of modified PVA molecules in addition to the ones specifically described in relation to these exemplary experiments may be used to affect the levels of ice nucleation in other embodiments.

Figure 9A:
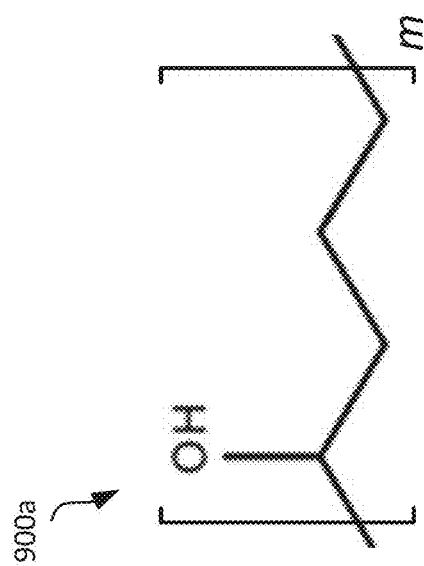
Figure 9B:
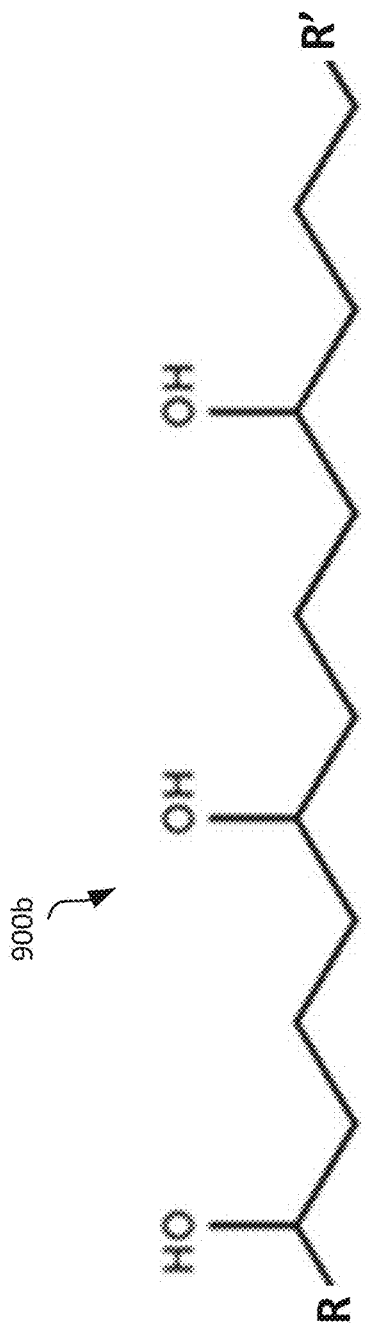

FIGS. 9A and 9B illustrate exemplary modified PVA molecules that may be used to inhibit ice nucleation and may be incorporated into the methods, compounds, and compositions of the present disclosure. Specifically, FIG. 9A illustrates a modified polyvinyl alcohol subunit 900a consisting of two polyvinyl alcohol monomers with a hydroxyl group removed from one of the monomers. A polymer consisting of m modified polyvinyl alcohol subunits 900a may be evaluated using the exemplary experimental nucleation simulations disclosed herein and used to inhibit ice nucleation. For example, a polymer comprising 100 or fewer modified polyvinyl alcohol subunits 900a (m<=100), or 200 or fewer mers, may be used to inhibit ice nucleation since polymers of shorter lengths may enable improved ice nucleation inhibition functionality. FIG. 9B illustrates a modified polyvinyl alcohol molecule 900b consisting of three joined modified polyvinyl alcohol subunits 900a with two attached molecular groups at either end (R and R'). The two molecular groups, R and R', may each comprise at least one of an extended chain of modified polyvinyl subunits 900a, an extended chain of modified polyvinyl monomers, cap compounds, and other functional groups. R and R' may, for example, be selected to enhance the ice nucleation functionality, stability, or cost-effectiveness of the modified polyvinyl alcohol molecule 900b. It is contemplated that other modified polyvinyl molecules comprising other modifications, such as additional functional groups, may be utilized to inhibit ice nucleation without departing from the scope of the present disclosure.

Figure 10:
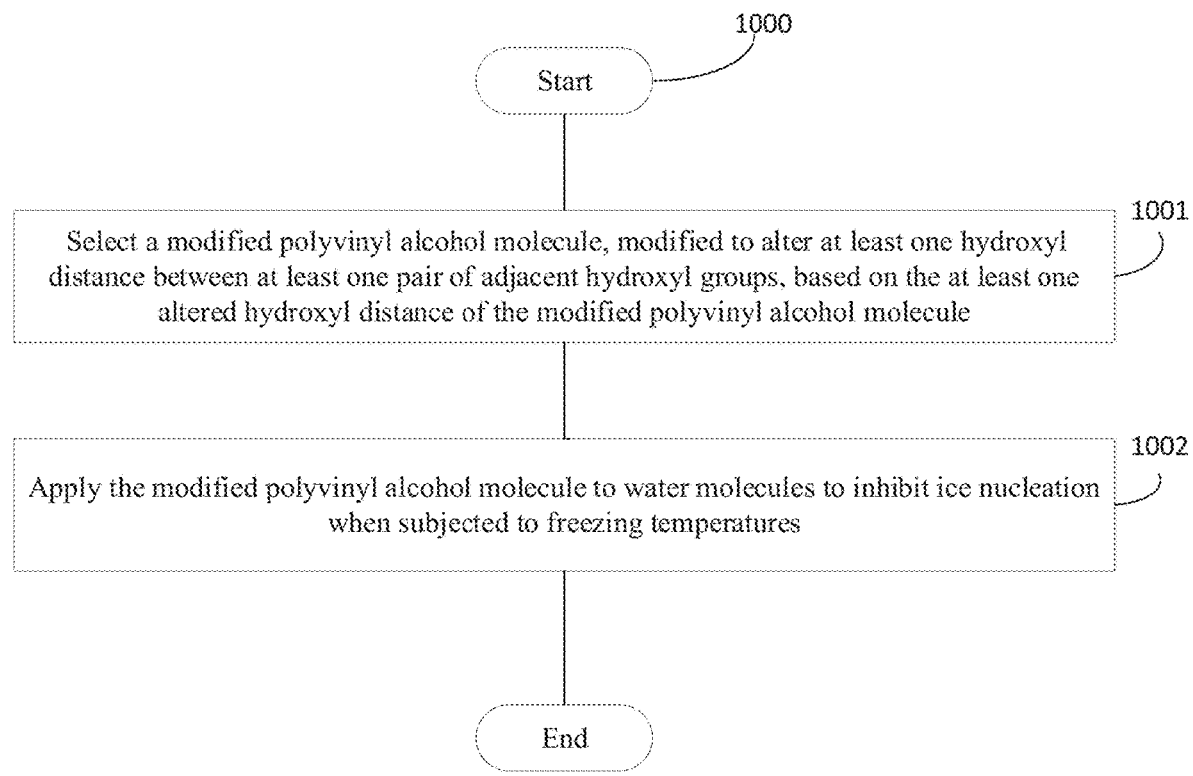
FIG. 10 illustrates a flowchart depicting an exemplary method for inhibiting ice nucleation that may be traversed in connection with embodiments disclosed herein.

FIG. 10 illustrates a method 1000 for inhibiting ice nucleation that may be traversed in connection with embodiments of the present disclosure. The method may comprise, in Block 1001, selecting a modified polyvinyl alcohol molecule, modified to alter at least one hydroxyl distance between at least one pair of adjacent hydroxyl groups, based on the at least one altered hydroxyl distance of the modified polyvinyl alcohol molecule. The method may further comprise, in Block 1002, applying the modified polyvinyl alcohol molecule to water molecules to inhibit ice nucleation when subjected to freezing temperatures. The modified polyvinyl alcohol molecule may be a modified polyvinyl alcohol molecule in accordance with the compounds and compositions of the present disclosure. For example, the modified polyvinyl alcohol molecule may be modified to alter the at least one hydroxyl distance between the at least one pair of adjacent hydroxyl groups on a polymer backbone of the polyvinyl alcohol molecule. Such modification may include the relocation, removal, or addition of hydroxyl groups and other functional groups along the polymer backbone of the modified polyvinyl alcohol molecule. For example, a functional group may be added to each end of each of the modified polyvinyl alcohol molecule as a cap compound.

In some embodiments, the selecting of Block 1001 may include selecting the modified polyvinyl alcohol molecule based on the at least one altered hydroxyl distance of the modified polyvinyl alcohol molecule, wherein the at least one altered hydroxyl distance may be at least one of greater than ~2.8 Å and less than ~7.1 Å, greater than ~2.8 Å and less than ~6.7 Å, greater than ~2.8 Å and less than ~6.5 Å, and greater than ~3.1 Å and less than ~6.5 Å. Such hydroxyl distances may enable the modified polyvinyl alcohol molecule to effectively inhibit ice nucleation.

In some embodiments, the selecting of Block 1001 may include selecting the modified polyvinyl alcohol molecule based on an average hydroxyl distance between each pair of adjacent hydroxyl groups of the modified polyvinyl alcohol molecule, wherein the average hydroxyl distance may be at least one of greater than ~2.8 Å and less than ~7.1 Å, greater than ~2.8 Å and less than ~6.7 Å, greater than ~2.8 Å and less than ~6.5 Å, and greater than ~3.1 Å and less than ~6.5 Å.

In some embodiments, the selecting of Block 1001 may include selecting the modified polyvinyl alcohol molecule based each hydroxyl distance between each pair of adjacent hydroxyl groups of the modified polyvinyl alcohol molecule, wherein each hydroxyl distance may be at least one of greater than ~2.8 Å and less than ~7.1 Å, greater than ~2.8 Å and less than ~6.7 Å, greater than ~2.8 Å and less than ~6.5 Å, and greater than ~3.1 Å and less than ~6.5 Å.

In some embodiments, the selecting of Block 1001 may include selecting the modified polyvinyl alcohol molecule, wherein the polyvinyl alcohol molecule may comprise 200 or fewer mers. Each mer may, for example, comprise three carbons of the polymer backbone along with any attached functional groups. The mers may differ, such as with different functional groups. For example, some mers may have no functional group, while others may have a hydroxyl group attached. Shorter modified polyvinyl alcohol molecules, such as 200 or fewer mers, may enable heightened interaction with water molecules and more effective ice nucleation inhibition.

In some embodiments, the selecting of Block 1001 may include selecting the modified polyvinyl alcohol molecule based on an evaluation of the ice nucleation inhibition efficacy of the modified polyvinyl alcohol molecule. For example, the evaluation may comprise the methods taught by the exemplary experimental nucleation simulations of the present disclosure. In a more specific example, computational molecular dynamics simulations of ice nucleation may be conducted incorporating the modified polyvinyl alcohol molecule to evaluate its effects ice nucleation, such as by observing changes in total potential energy over time and how the modified polyvinyl alcohol molecule interacts with water molecules before, during, and after ice nucleation.

In some embodiments, the applying of Block 1002 may include incorporating the modified polyvinyl alcohol molecule into a liquid composition and applying the liquid composition to water molecules to inhibit ice nucleation when subjected to freezing temperatures. For example, the liquid composition may be an antifreeze solution, and the modified polyvinyl alcohol molecule may comprise 100 to 150 mers. The liquid composition may, for example, enable more efficient storage, distribution, and application of the modified polyvinyl alcohol molecule, such as through washing, spraying, mixing, etc. onto or into a medium to inhibit ice nucleation. Additionally, the liquid composition may enable the incorporation of supplemental compounds that may enhance the functionality of the modified polyvinyl alcohol molecule. For example, enzymes may be incorporated into the liquid composition and be configured to reduce the length of the modified polyvinyl alcohol molecule, such as to improve inhibition of ice nucleation, and break down the modified polyvinyl alcohol molecule over time, such as to improve biodegradability and reduce potential environmental concerns.

In some embodiments, the applying of Block 1002 may include incorporating the modified polyvinyl alcohol molecule into a solid composition, the solid composition configured to receive and slowly release modified polyvinyl alcohol molecules. The applying of Block 1002 may further include applying the solid composition to water molecules to inhibit ice nucleation when subjected to freezing temperatures. For example, the solid composition may comprise a solid three-dimensional polymer mesh, a porous silicone or rubber material, or other porous media configured to receive and slowly release modified polyvinyl alcohol molecules over time, and the modified polyvinyl alcohol molecule may be incorporated into the mesh or pores of such a solid composition. Such incorporation of the modified polyvinyl alcohol molecule into a solid composition for slow release may enable more versatile and longer lasting application of the modified polyvinyl alcohol molecule to inhibit ice nucleation. For example, the solid composition may be applied to a surface to form a surface coating that may slowly release one or more modified polyvinyl alcohol molecules to inhibit ice nucleation. Such a surface coating may easily be applied to automobiles, aircraft, spacecraft, infrastructure, sidewalks, homes, and a wide variety of surfaces that may potentially be exposed to freezing temperatures.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A composition comprising as an active ingredient an effective amount of modified polyvinyl alcohol molecules, each modified to alter at least one hydroxyl distance between at least one pair of adjacent hydroxyl groups on a polymer backbone of each polyvinyl alcohol molecule, to inhibit ice nucleation, wherein an average hydroxyl distance between each pair of adjacent hydroxyl groups on the polymer backbone of each of the modified polyvinyl alcohol molecules is greater than ~2.8 Å and less than ~7.1 Å, wherein the composition is a liquid antifreeze solution.

2. The composition of claim 1, wherein the composition comprises a solid medium configured to receive and slowly release the modified polyvinyl alcohol molecules.

3. The composition of claim 2, wherein the solid medium is a surface coating.

* * * * *